(12) United States Patent
Lee et al.

(10) Patent No.: US 7,903,372 B2
(45) Date of Patent: Mar. 8, 2011

(54) MAGNETIC RECORDING HEAD AND METHOD OF MANUFACTURING THE SAME

(75) Inventors: Hoo-san Lee, Osan-si (KR); Young-hun Im, Suwon-si (KR); Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 11/329,062

(22) Filed: Jan. 11, 2006

(65) Prior Publication Data

US 2006/0158780 A1 Jul. 20, 2006

Related U.S. Application Data

(60) Provisional application No. 60/658,150, filed on Mar. 4, 2005.

(30) Foreign Application Priority Data

Jan. 11, 2005 (KR) ........................ 10-2005-0002448

(51) Int. Cl.
  *G11B 5/187* (2006.01)
  *G11B 5/11* (2006.01)
  *G11B 5/31* (2006.01)

(52) U.S. Cl. .................. 360/125.3; 360/125.13

(58) Field of Classification Search ........... 360/123.02–123.12, 125.02–125.32
  See application file for complete search history.

(56) References Cited

U.S. PATENT DOCUMENTS

| 4,656,546 | A | | 4/1987 | Mallory |
| 4,935,832 | A | * | 6/1990 | Das et al. ..................... 360/112 |
| 5,003,423 | A | | 3/1991 | Imamura et al. |
| 5,075,956 | A | * | 12/1991 | Das ............................. 29/603.14 |
| 5,081,554 | A | * | 1/1992 | Das ............................. 360/327.1 |
| RE33,949 | E | * | 6/1992 | Mallary et al. ................ 360/110 |
| 6,697,221 | B2 | | 2/2004 | Sato et al. |
| 6,707,642 | B1 | | 3/2004 | Batra |
| 6,710,973 | B2 | * | 3/2004 | Okada et al. ............. 360/125.13 |
| 6,809,899 | B1 | | 10/2004 | Chen et al. |
| 6,954,340 | B2 | * | 10/2005 | Shukh et al. .................. 360/317 |
| 7,002,775 | B2 | * | 2/2006 | Hsu et al. ................. 360/125.03 |
| 7,006,326 | B2 | * | 2/2006 | Okada et al. ............. 360/125.13 |
| 7,075,756 | B1 | * | 7/2006 | Mallary et al. ................ 360/317 |
| 7,196,871 | B2 | * | 3/2007 | Hsu et al. ................. 360/125.03 |
| 7,227,720 | B2 | * | 6/2007 | Sasaki et al. ............. 360/125.12 |

(Continued)

FOREIGN PATENT DOCUMENTS

EP  0 333 347 A  9/1989

(Continued)

OTHER PUBLICATIONS

English-machine translation of Kameda et al. (JP 2004-348928 A), published on Dec. 9, 2004.*

*Primary Examiner* — William J Klimowicz
(74) *Attorney, Agent, or Firm* — Sughrue Mion, PLLC

(57) ABSTRACT

A magnetic recording head and a method of manufacturing the same. The magnetic recording head includes a stack containing a main pole and a return pole. The stack includes a first magnetic layer having a groove formed therein; an insulating layer covering a surface of the groove; and a second magnetic layer pattern filling the groove covered with the insulating layer.

8 Claims, 7 Drawing Sheets

U.S. PATENT DOCUMENTS

| | | | |
|---|---|---|---|
| 7,239,478 B1 * | 7/2007 | Sin et al. | 360/125.3 |
| 7,248,431 B1 * | 7/2007 | Liu et al. | 360/119.02 |
| 7,253,991 B2 * | 8/2007 | Fontana et al. | 360/125.3 |
| 7,295,401 B2 * | 11/2007 | Jayasekara et al. | 360/125.08 |
| 7,322,095 B2 * | 1/2008 | Guan et al. | 29/603.07 |
| 7,392,577 B2 * | 7/2008 | Yazawa et al. | 29/603.12 |
| 2002/0071208 A1 | 6/2002 | Batra et al. | |
| 2002/0176214 A1 | 11/2002 | Shukh et al. | |
| 2003/0151850 A1 | 8/2003 | Nakamura et al. | |
| 2005/0068669 A1 * | 3/2005 | Hsu et al. | 360/125 |
| 2005/0068678 A1 * | 3/2005 | Hsu et al. | 360/126 |
| 2005/0141137 A1 * | 6/2005 | Okada et al. | 360/122 |
| 2005/0219743 A1 * | 10/2005 | Guan et al. | 360/125 |
| 2005/0280936 A1 * | 12/2005 | Sasaki et al. | 360/126 |
| 2006/0044681 A1 * | 3/2006 | Le et al. | 360/126 |
| 2006/0092575 A1 * | 5/2006 | Mochizuki et al. | 360/317 |

FOREIGN PATENT DOCUMENTS

| | | | |
|---|---|---|---|
| JP | 62-129916 A | | 6/1987 |
| JP | 02-014410 A | | 1/1990 |
| JP | 07240009 A | * | 9/1995 |
| JP | 8-147623 A | | 6/1996 |
| JP | 2000-251227 A | | 9/2000 |
| JP | 2002-092821 A | | 3/2002 |
| JP | 2004-348928 A | | 12/2004 |
| JP | 2004348928 A | * | 12/2004 |

* cited by examiner

MAGNETIC RECORDING HEAD AND METHOD OF MANUFACTURING THE SAME

CROSS-REFERENCE TO RELATED PATENT APPLICATION

This application claims the benefit of US Provisional Patent Application No. 60/658,150, filed on Mar. 4, 2005, in the United States Patent and Trademark Office, and priority from Korean Patent Application No. 10-2005-0002448, filed on Jan. 11, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a data recording apparatus and a method of manufacturing the same and, more particularly, to a magnetic recording head and a method of manufacturing the same.

2. Description of the Related Art

Magnetic recording media can be classified into longitudinal magnetic recording media and perpendicular magnetic recording media according to whether magnetization is longitudinal or perpendicular to a surface of a recording medium. As the demand for recording media with higher data recording density increases, increasing attention is being directed toward perpendicular magnetic recording media. Because a magnetic recording medium is very closely related to a magnetic recording head, as attention toward perpendicular magnetic recording media increases, attention toward a magnetic recording head used in writing data on a perpendicular magnetic recording media is also increasing. A main pole and a return pole in a magnetic recording head are used in writing data directly on a magnetic recording medium. Thus, the stability and excellence of a magnetic recording head are closely related to the return pole and the main pole and, in particular, the main pole.

FIG. 1 illustrates the relationship between a selected track 12 on which a magnetization pattern, that is, bit data is written and a rectangular main pole 10 used in a conventional magnetic recording head when a skew angle of the main pole 10 is 10°. Referring to FIG. 1, when the bit data is written on the selected track 12, a portion 10a of the main pole 10 deviates from the selected track 12.

FIG. 2 is a magnetic force microscopy (MFM) image of a bit data recorded on a perpendicular magnetic recording medium using the conventional magnetic recording head including the main pole 10 shown in FIG. 1. Reference numeral 14 in FIG. 2 indicates a magnetization pattern recorded on a periphery of the track 12 by the portion 10a of the main pole 10 deviating from the track 12 while a magnetization pattern is recorded by the main pole 10 of the magnetic head on the track 12. When a magnetization pattern is recorded on a track adjacent to the track 12, a wrong magnetization pattern is recorded on the track adjacent to the track 12 by the magnetization pattern 14. To prevent this problem, it is desirable to have the magnetization pattern 14 not to be recorded on a track adjacent to the track 12 while a magnetization pattern is recorded on the track 12. Thus, there is a need for a novel main pole not affecting recording on a track adjacent to a main track on which a magnetization pattern is recorded. FIG. 3 illustrates one of main poles introduced to satisfy this requirement. While the main pole 10 illustrated in FIG. 1 is rectangular, a main pole 18 illustrated in FIG. 3 has a trapezoidal shape tapering end to end. The main pole 18 is formed by removing a portion of the rectangular pole 10 illustrated in FIG. 1.

More specifically, when the main pole 10 is used to write a magnetization pattern on an inner track located interior to the track 12, a case opposite to that illustrated in FIG. 1 appears. That is, as the skew angle changes in the opposite direction, the portion 10a of the main pole 10 that was originally exposed outside the track 12 is then located within the inner track on which a magnetization pattern will be recorded while a lower portion of the main pole 10 that was originally located within the track 12 is then located outside the inner track 12.

To prevent unnecessary magnetization patterns from being recorded on a track other than a selected track, it is necessary to remove the portion 10a of the main pole 10 located outside the track 12 as well as the portion of the main pole 10 deviating from another selected track located interior to the track 12 when a magnetization pattern is recorded on the other selected track at a different skew angle.

Reference numeral 16a in FIG. 3 indicates a removed portion of the main pole 18 corresponding to the portion 10a of the main pole 10 exposed outside the track 12 when the main pole 10 shown in FIG. 1 having the skew angle of 10° writes a magnetization pattern on the track 12. Also, reference numeral 16b in FIG. 3 indicates a removed portion of the main pole 18 corresponding to the portion of the main pole 10 exposed outside the inner track when the main pole 10 shown in FIG. 1 is used to write a magnetization pattern on the inner track.

FIG. 4 illustrates a magnetization pattern recorded on a selected track 12 using the main pole 18 of FIG. 3. As is evident from FIG. 4, a magnetization pattern with alternating black and white lines is recorded on a selected track 12 only, not on a periphery of the track 12.

FIG. 5 illustrates a change in erase band width with respect to the geometrical shape of a main pole contacting a magnetic recording medium and a skew angle.

Referring to FIG. 5, when a portion of the main pole facing the magnetic recording medium has a rectangular shape (indicated by ▲), the erase band width increases as a skew angle increases. On the other hand, when the portion of the main pole is trapezoidal (indicated by ●), the erase band width does not increase as the skew angle increases.

FIGS. 6-9 illustrate a process of manufacturing a main pole and a return pole in a conventional magnetic recording head.

Referring to FIG. 6, an insulating layer 22 is formed on a NiFe magnetic layer 20 that will be used as a return pole. A photoresist pattern 24 is formed on the insulating layer 22 and defines a region where a main pole will be formed. Using the photoresist pattern 24 as a mask, the defined region of the insulating layer 22 is etched to form a groove 26 in the insulating layer 22 as illustrated in FIG. 7.

Referring to FIG. 8, a magnetic layer 28 is formed on the insulating layer 22 in which the groove 26 has been formed and fills the groove 26. The magnetic layer 28 is formed of a magnetic substance with high saturation magnetic flux density Bs. Referring to FIG. 9, a top surface of the magnetic layer 28 is polished until the insulating layer 22 is exposed to form a magnetic layer pattern 28a filling the groove 26. The magnetic layer pattern 28a is used as the main pole. An arrow in FIG. 9 indicates a direction in which a recording medium moves.

FIGS. 10-12 illustrate a method of manufacturing a conventional magnetic recording head with side shields on either side of a main pole in order to reduce the effect of a magnetic field generated by the main pole on adjacent tracks.

Referring to FIGS. 10 and 11, an insulating layer 22 is formed on a magnetic layer 20. Then, a photoresist pattern 30 is formed on the insulating layer 22 and defines a first region R1 in which a main pole will be formed and second and third regions R2 and R3 where side shields will be formed. Using the photoresist pattern 30 as a mask, a magnetic layer 32 is formed on the insulating layer 22 using an electroplating method. Referring to FIG. 12, the photoresist pattern 30 is then removed to form first through third magnetic layer pattern 32a through 32c. The first magnetic layer pattern 32a is used as the main pole while the second and third magnetic layer patterns 32b and 32c are used as side shields to prevent a magnetic field generated by the main pole 32a from extending to adjacent tracks.

Because the main pole 28a in the conventional magnetic recording head manufactured according to the steps illustrated in FIGS. 6-9 is formed using a photo process and an etching process, it is difficult to precisely control a distance between the main pole 28a and the return pole 20. Furthermore, for the conventional magnetic recording head manufactured using the method illustrated in FIGS. 10-12, in which the distance between the main pole 32a and one of the side shields 32b and 32c is determined by the photoresist pattern 30, the distance is eventually determined by the resolution of an exposure system used. Thus, it is also difficult to precisely control the distance between the main pole 32a and one of the side shields 32b and 32c.

SUMMARY OF THE INVENTION

The present invention provides a magnetic recording head that can precisely control a distance between the main pole and either a side shield or a return pole and be manufactured using a reduced number of photo processes and etching processes while maintaining the advantages of a conventional magnetic recording head.

The present invention also provides a method of manufacturing the magnetic recording head.

According to an aspect of the present invention, there is provided a magnetic recording head including a stack. The stack includes a first magnetic layer having a groove formed therein; an insulating layer covering a surface of the groove; and a second magnetic layer pattern filling the groove covered with the insulating layer.

The second magnetic layer pattern may have a higher saturation magnetic flux density than the first magnetic layer. The groove may have a circular or trapezoidal cross-section.

A return shield may be further provided so that the second magnetic layer pattern is situated between the first magnetic layer and the return shield. The return shield may be separated from the first magnetic layer and the second magnetic layer pattern.

According to another aspect of the present invention, there is provided a method of manufacturing a magnetic recording head including a stack. The stack is formed by the steps of: forming a groove in a first magnetic layer; forming an insulating layer covering a surface of the groove on the first magnetic layer; forming a second magnetic layer filling the groove on the insulating layer; and polishing the second magnetic layer and the insulating layer until the first magnetic layer around the groove is exposed.

The step of forming the groove may further include the steps of: forming a mask exposing a portion of the first magnetic layer on the first magnetic layer; etching an exposed portion of the first magnetic layer for a predetermined time; and removing the mask. The exposed portion of the first magnetic layer is etched using an isotropic etching.

A return shield may be further formed over the first magnetic layer and the polished second magnetic layer. The return shield is separated from the first magnetic layer and the polished second magnetic layer.

The present invention eliminates the effect of a skew angle while achieving stability in a magnetic recording process by precisely controlling the distance between the main pole and the return pole. The present invention can also reduce the number of photo processes and etching processes.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
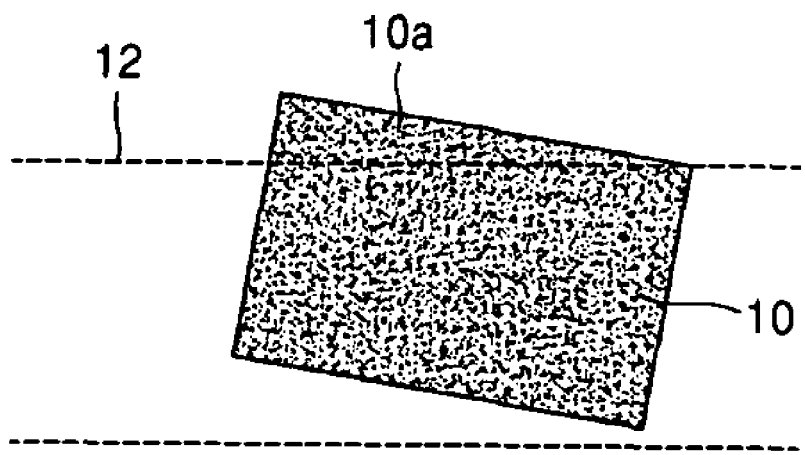
FIG. 1 illustrates a case in which a main pole of a conventional magnetic recording head gets access to a track at a given skew angle.
Figure 2:
FIG. 2 is a magnetic force microscopy (MEM) image showing a problem that occurs when a main pole gets access to a track as shown in FIG. 1.
Figure 3:
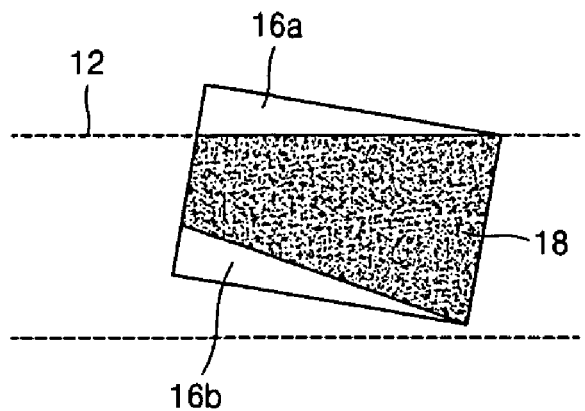
FIG. 3 illustrates the shape of a conventional main pole introduced to overcome the problem illustrated in FIG. 2.
Figure 4:
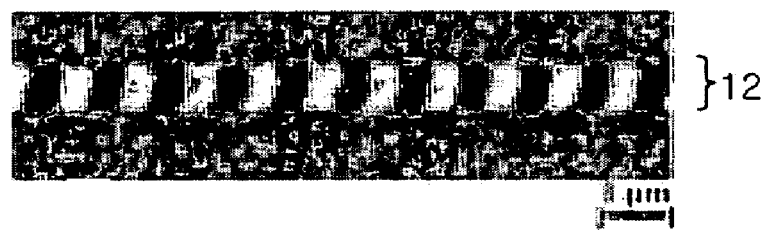
FIG. 4 is an MFM image showing a magnetization pattern recorded on a selected track using the main pole of FIG. 3.
Figure 5:
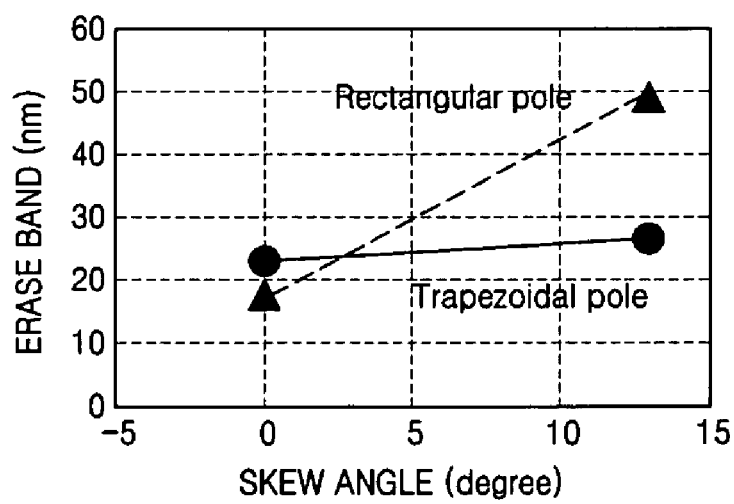
FIG. 5 is a graph showing changes in erase band width for the main poles illustrated in FIGS. 1 and 3 with respect to a skew angle.
Figure 6:
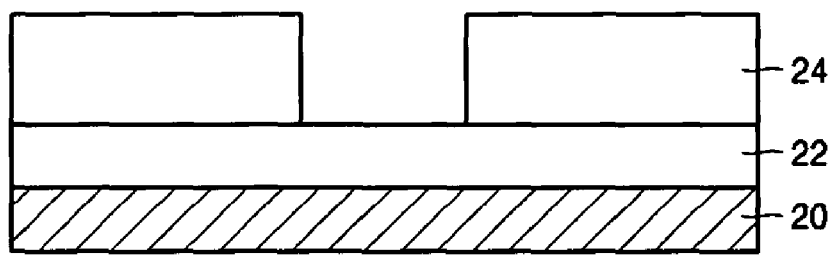
FIGS. 6-9 are cross-sectional views illustrating a method of manufacturing a stack containing a main pole and a return pole in a conventional magnetic recording head including the main pole of FIG. 3.
Figure 7:
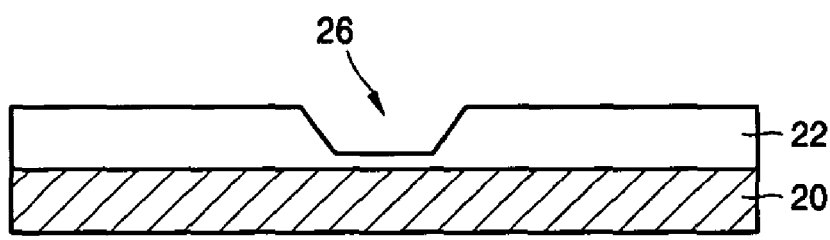
Figure 8:
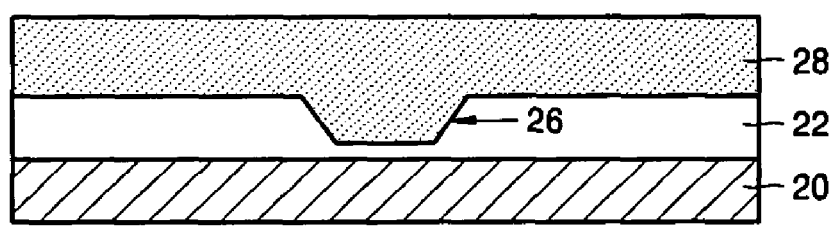
Figure 9:
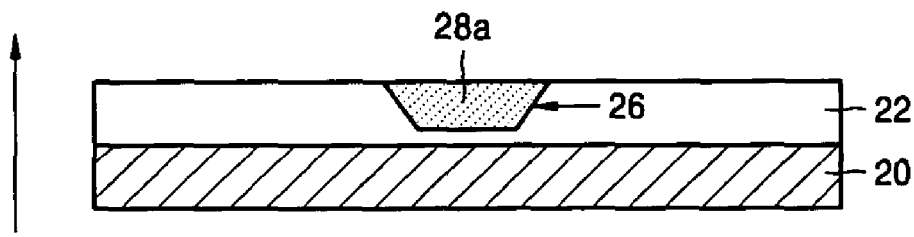
Figure 10:
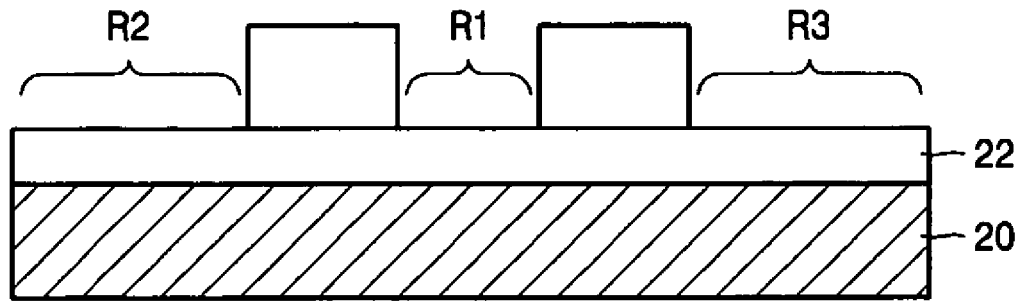
FIGS. 10-12 are cross-sectional views illustrating a method of manufacturing a stack containing a main pole and side shields disposed at either side of the main pole in a conventional magnetic recording head.
Figure 11:
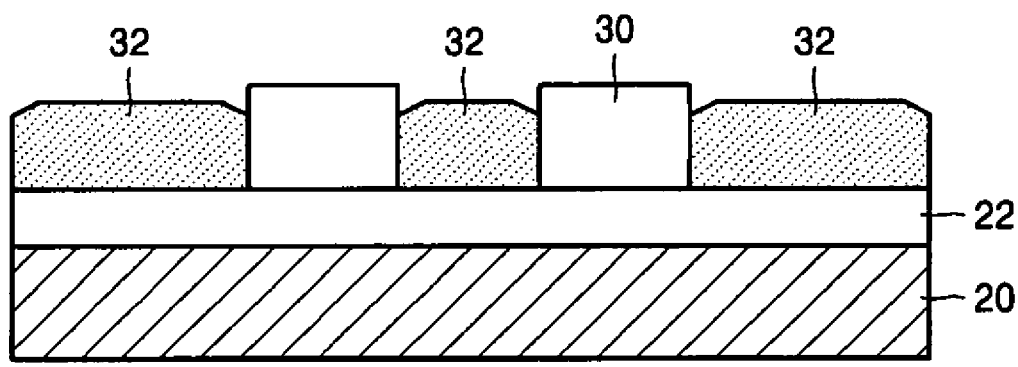
Figure 12:
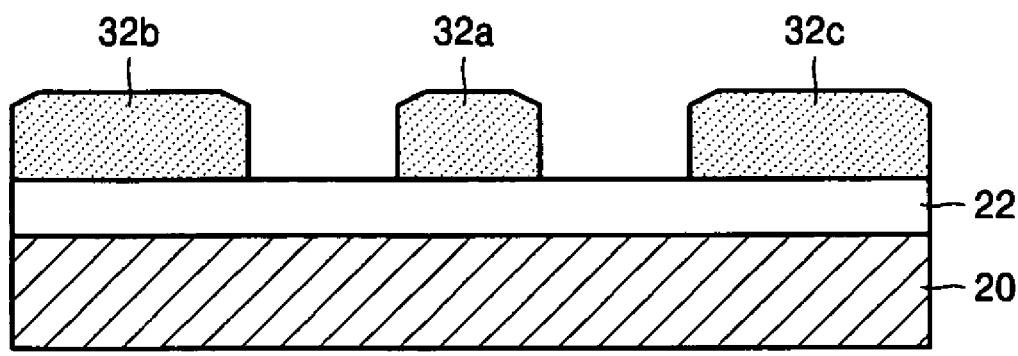

Hereinafter, magnetic recording head and methods of manufacturing the same according to exemplary embodiments of the present invention will be described in detail with reference to accompanying drawings. In the drawings, the thicknesses of layers and regions are exaggerated for clarity.

Magnetic recording heads according to exemplary embodiments of the present invention will now be described with reference to FIGS. 13 and 14.

Figure 13:
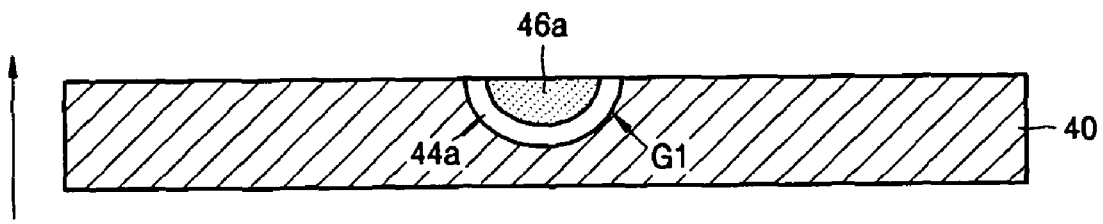
FIG. 13 is a cross-sectional view of a portion of a stack containing a main pole and a return pole in a magnetic recording head facing a recording medium according to an exemplary embodiment of the present invention.

FIG. 13 is a cross-sectional view of a portion that a stack containing a main pole and a return pole in a magnetic recording head facing a recording medium according to an exemplary embodiment of the present invention.

Referring to FIG. 13, a groove G1 having a semi-circular cross-section is formed in a predetermined region of a first magnetic layer 40 that is used as a return pole. For example, the first magnetic layer 40 may be a permalloy (NiFe) layer. A surface of the groove G1 is covered with an insulating pattern 44a of a uniform thickness. The insulating pattern 44a may be an aluminum oxide layer. The groove G1 covered with the insulating pattern 44a is filled with a second magnetic layer pattern 46a that is used as a main pole. The second magnetic layer pattern 46a may be a magnetic material with high saturation magnetic flux density Bs. According to the current exemplary embodiment of the present invention, the groove G1 has a semi-circular cross-section, but the cross-section of the groove G1 may have other shapes. FIG. 14 illustrates a magnetic recording head with a groove G2 having a trapezoidal cross-section formed in the first magnetic layer 40 according to another exemplary embodiment of the present invention. Arrows in FIGS. 13 and 14 indicate the direction in which a magnetic recording medium (not shown) moves.

Methods of manufacturing the magnetic recording heads of FIGS. 13 and 14 according to exemplary embodiments of the present invention will now be described with reference to FIGS. 15-19 and FIGS. 20-22, respectively.

Figure 15:
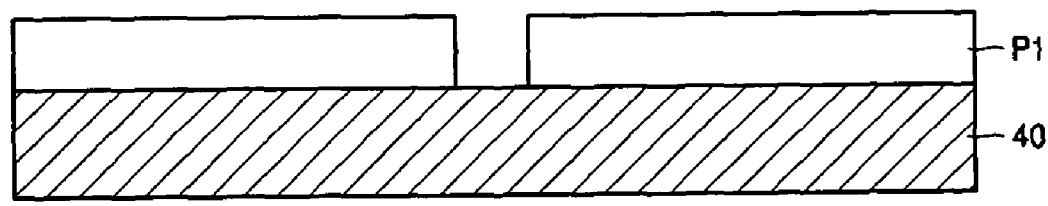
FIGS. 15-19 are cross-sectional views illustrating steps of a method of manufacturing the magnetic recording head of FIG. 13 according to an exemplary embodiment of the present invention.
Figure 16:
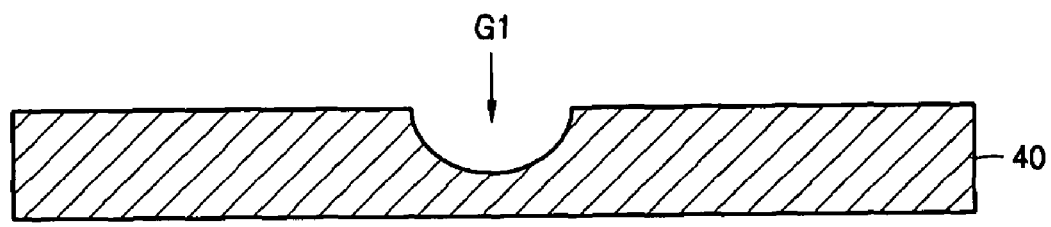

Referring to FIG. 15, a mask pattern P1 exposing a predetermined region of the first magnetic layer 40 is formed on the first magnetic layer 40. The mask pattern P1 may be a photoresist pattern. The exposed region of the first magnetic layer 40 is isotropically wet etched using a predetermined etchant such as Citric Acidic Peroxodisulphate for a predetermined time. The isotropic wet etching is performed on the exposed region at the same rate in all directions. Thus, the wet etching is performed to form the groove G1 having a predetermined depth and semi-circular cross-section in the first magnetic layer 40 as illustrated in FIG. 16. After the wet etching, the mask pattern P1 is removed.

Figure 17:
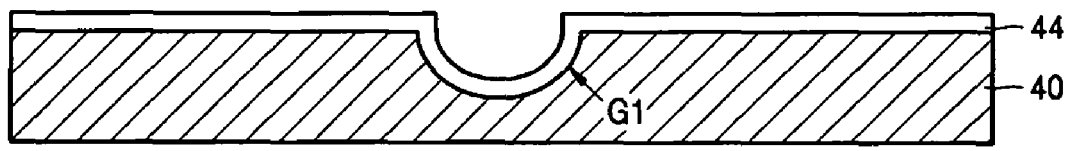

Referring to FIG. 17, an insulating layer 44 is formed on the first magnetic layer 40 having the groove G1 and covers the surface of the groove G1. The insulating layer 44 may be formed to a uniform thickness that is sufficiently small not to fill the groove G1.

Figure 18:
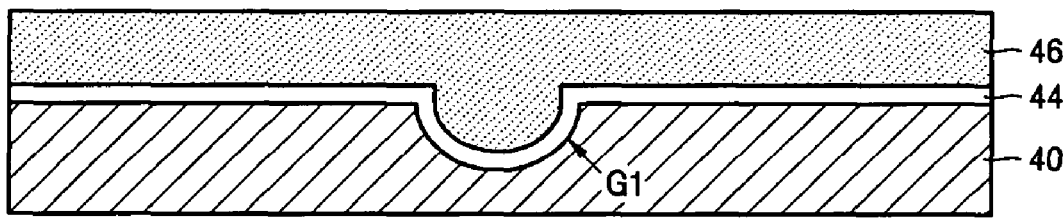
Figure 19:
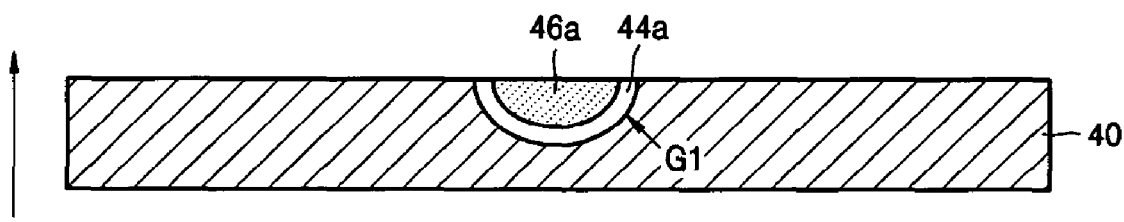

Referring to FIG. 18, a second magnetic layer 46 is formed on the insulating layer 44 so as to fill the groove G1. Subsequently, a top surface of the second magnetic layer 46 is polished using a technique such as chemical mechanical polishing (CMP) until the first magnetic layer 40 is exposed. Referring to FIG. 19, the polishing is performed to cover the surface of the groove G1 with the insulating pattern 44a while filling the remaining portion of the groove G1 with the second magnetic layer pattern 46a. The first magnetic layer 40 acts as a return pole and a side shield. The second magnetic layer pattern 46a is used as a main pole.

Figure 14:
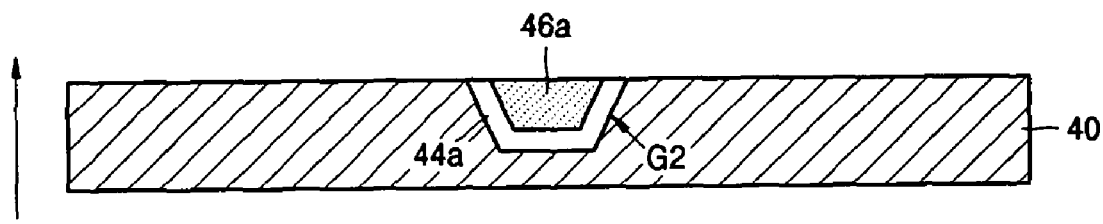
FIG. 14 is a cross-sectional view of a portion that a stack containing a main pole and a return pole in a magnetic recording head facing a recording medium according to another exemplary embodiment of the present invention.
Figure 20:
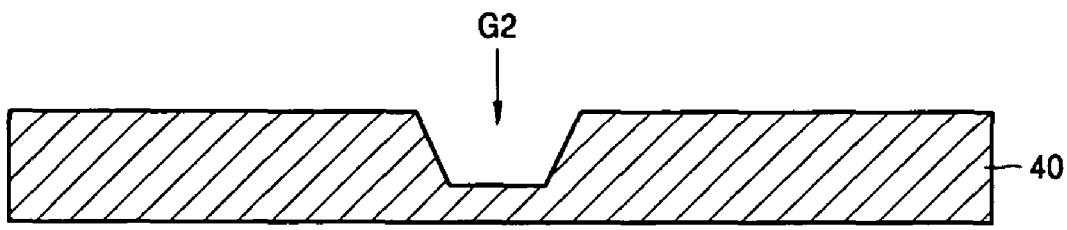
FIGS. 20-22 are cross-sectional views illustrating steps of a method of manufacturing the magnetic recording head of FIG. 14 according to another exemplary embodiment of the present invention.
Figure 21:
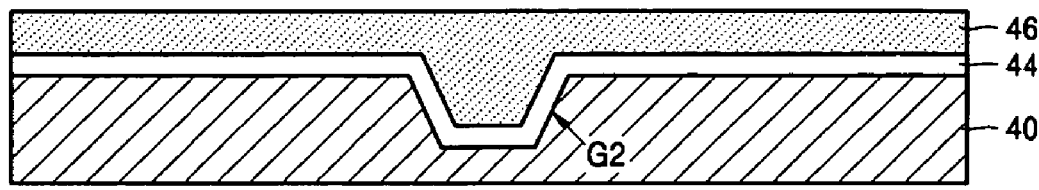
Figure 22:
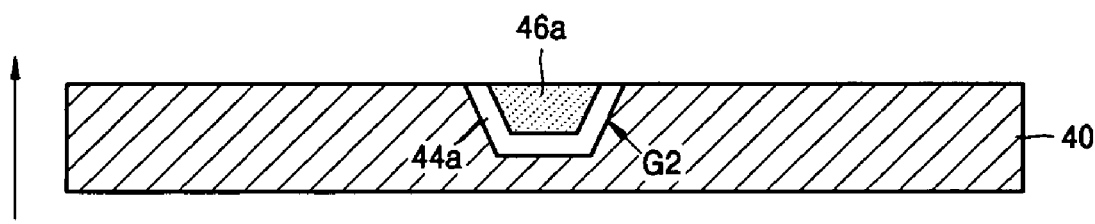

FIGS. 20-22 are cross-sectional views illustrating steps of a method of manufacturing the magnetic recording head of FIG. 14 according to another exemplary embodiment of the present invention. Referring to FIG. 20, a groove G2 having a different cross-sectional shape than that of the groove G1 illustrated in FIG. 16 is formed in the first magnetic layer 40. The groove G2 illustrated in FIG. 20 has a trapezoidal cross-section and is formed by dry etching. FIGS. 21 and 22 illustrate subsequent process steps that are the same as illustrated in FIGS. 17-19. Because the first and second magnetic layers 40 and 46 and the insulating layer 44 have the same structures and functions as their counterparts in FIG. 13, detailed descriptions thereof will be omitted.

Figure 23:
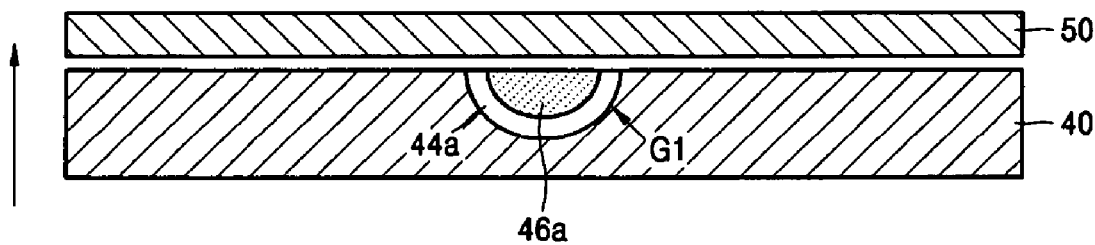
FIG. 23 is a cross-sectional view of the magnetic recording head of FIG. 13 further comprising a return shield provided over a main pole and a return pole.

Meanwhile, as shown in FIG. 23, the magnetic recording head according to an exemplary embodiment of the present invention further comprises a return shield 50 improving field gradient. The return shield 50 may be provided on the first magnetic layer 40 and the second magnetic layer pattern 46a. The return shield 50 may be separated from the first magnetic layer 40 and the second magnetic layer pattern 46a.

Also, the manufacturing method of the present invention may further comprise a step of forming the return shield 50 on the first magnetic layer 40 and the second magnetic layer pattern 46a. In this case, the return shield 50 may be separated from the first magnetic layer 40 and the second magnetic layer pattern 46a.

As illustrated in FIGS. 13 and 14, the second magnetic layer pattern 46a and the insulating pattern 44a are formed within the groove G1 or G2 in the first magnetic layer 40, thus eliminating the effect of a skew angle resulting from the geometrical shape of the second magnetic layer pattern 46a acting as a main pole.

The first magnetic layer 40 serves as both the return pole and the side shield, thereby minimizing the effect of a magnetic field generated by the second magnetic layer pattern 46a on an adjacent track while reducing the number of photo processes and etching processes.

The invention should not be construed as being limited to the embodiments set forth herein; rather, these embodiments are provided so that this disclosure will be thorough and complete. For example, it will be understood by those of ordinary skill in the art that a groove used in the present invention may have various other shapes and the technical idea of the present invention can also be applied to longitudinal magnetic recording media. That is, various changes in form and details may be made therein without departing from the spirit and scope of the present invention as defined by the following claims.

What is claimed is:

1. A magnetic recording head comprising a stack, wherein the stack comprises:
    a first magnetic layer formed as a single body and comprising a groove formed therein;
    an insulating layer having a substantially uniform thickness throughout the entire insulating layer and covering a surface of the groove; and
    a second magnetic layer filling the groove covered with the insulating layer,
    wherein an entire surface of the stack on which the second magnetic layer is formed is substantially flat, and
    wherein a polished surface of the first magnetic layer, a polished surface of the second magnetic layer, and top surfaces of the insulating layer, form a single continuous planar surface of the stack on which the second magnetic layer is formed.

2. The magnetic recording head of claim 1, wherein the second magnetic layer has a higher saturation magnetic flux density than the first magnetic layer.

3. The magnetic recording head of claim 1, wherein the groove has one of circular and trapezoidal cross-sections.

4. The magnetic recording head of claim 1, further comprising a return shield, wherein the second magnetic layer is situated between the first magnetic layer and the return shield.

5. The magnetic recording head of claim 4, wherein the return shield is separated from the first magnetic layer and the second magnetic layer by a predetermined distance.

6. The magnetic recording head of claim 4, wherein the return shield constitutes a separate layer having a predetermined thickness.

7. The magnetic recording head of claim 4, wherein the return shield is configured to adjust a field gradient.

8. The magnetic recording head of claim 1, wherein the thickness of the stack is uniform so that the thickness at a position of the groove filled with the insulating layer and the second magnetic layer is the same as the thickness at a position of an edge of the stack.

* * * * *